United States Patent

Moen et al.

[11] Patent Number: 5,864,604
[45] Date of Patent: Jan. 26, 1999

[54] METHOD OF PROVIDING MESSAGE SERVICE FOR LIMITED ACCESS TELECOMMUNICATIONS

[75] Inventors: Arthur J. Moen, Clinton, N.J.; Alexander I. Poltorak, Monsey, N.Y.

[73] Assignee: General Patent Corp, Monsey, N.Y.

[21] Appl. No.: 779,208

[22] Filed: Jan. 6, 1997

Related U.S. Application Data

[63] Continuation-in-part of Ser. No. 247,037, May 20, 1994, Pat. No. 5,592,537.

[51] Int. Cl.⁶ ............................................. H04M 1/64
[52] U.S. Cl. ........................ 379/88; 379/112; 379/114; 395/200.47; 705/26
[58] Field of Search ................... 379/67, 88, 89, 379/90.01, 91.01, 91.02, 93.01, 93.02, 93.04, 144, 111, 112, 114, 357, 375, 377, 380, 382; 705/16–28; 370/389, 392, 382, 485; 395/389, 392, 382, 485

[56] References Cited

U.S. PATENT DOCUMENTS

| | | |
|---|---|---|
| 4,162,377 | 7/1979 | Mearns . |
| 4,592,048 | 5/1986 | Beckner et al. ............... 370/170.1 |
| 4,706,275 | 11/1987 | Kamil . |
| 4,757,186 | 7/1988 | Heberle et al. . |
| 4,792,968 | 12/1988 | Katz ................................. 379/92 |
| 4,845,739 | 7/1989 | Katz ................................. 379/92 |
| 4,850,007 | 7/1989 | Marino et al. .................... 379/67 |
| 4,930,150 | 5/1990 | Katz ................................. 379/93 |
| 5,003,584 | 3/1991 | Benyacar et al. ................ 379/119 |
| 5,068,891 | 11/1991 | Marshall . |
| 5,109,408 | 4/1992 | Greenspan et al. . |
| 5,228,075 | 7/1993 | La et al. . |
| 5,251,251 | 10/1993 | Barber et al. .................... 379/88 |
| 5,265,155 | 11/1993 | Castro . |
| 5,333,186 | 7/1994 | Gueta ............................... 379/201 |
| 5,438,615 | 8/1995 | Moen ............................... 379/114 |
| 5,592,537 | 1/1997 | Moen ............................... 379/114 |
| 5,608,786 | 3/1997 | Gordon ............................ 379/100 |

*Primary Examiner*—Fan S. Tsang
*Attorney, Agent, or Firm*—Our Pal (R) Asija

[57] ABSTRACT

The present invention is directed to a method of operating a telecommunications system for providing a message service to a plurality of end users. Existing telecommunications lines in conjunction with a telecommunications network system such as the Internet, Intranet, Extranet or similar environment is utilized. A computerized system can be used to establish a billing system for sponsors and to form an account for each sponsor purchasing subsequent usage relating to a site address. The method also includes distributing a user unit to each of a plurality of end users for accessing the site address. Each user unit is given the site address, and at least one unique personal identification number. In connection with said billing system, the computerized system is programmed to permit a call of a preset message limit to be made by each end user to the site address provided. This is based on the distributed user unit and accessed only by the unique personal identification number provided to the end user. In response to an end user accessing the site address, a predetermined message is provided in accordance with the preset message limit. The messages record of each consumed user unit is captured by the computerized system and can be used by the sponsor for database marketing. The session is terminated and an appropriate amount is charged to the account of the sponsor.

19 Claims, 3 Drawing Sheets

METHOD OF PROVIDING MESSAGE SERVICE FOR LIMITED ACCESS TELECOMMUNICATIONS

This application is a continuation-in-part of application Ser. No. 08/247,037 filed May 20, 1994, which matured into U.S. Pat. No. 5,592,537 on Jan. 7, 1997 and which is expressly incoporated herein by reference.

FIELD OF THE INVENTION

The present invention relates generally to the field of telecommunications, and more particularly involves a method of providing a message service for limited access telecommunications to access a predetermined message via a telecommunications network system such as the Internet, Intranet, Extranet or similar environment.

BACKGROUND OF THE INVENTION

Various systems used for controlling, billing and blocking usage of telecommunications systems have been developed. The following is representative of the prior art:

U.S. Pat. No. 5,265,155 to Castro discloses a method and apparatus for prepayment of telecommunication connections between two telecommunication devices which involves storing telecommunication-time data representative of a prepurchased amount of telecommunication-time available for payment of telecommunication connections in a switching network. At the initiation of the first telecommunication device, a telecommunication connection is established between the first and second telecommunication devices so that a telecommunication process can be conducted therebetween. The telecommunication connection between the first and second telecommunication devices is terminated in response to termination of the telecommunication process. The time duration of the telecommunication connection is measured. The stored telecommunication-time data is processed to indicate a decrement in the available telecommunication-time, which is essentially equal to the measured time duration of the telecommunication connection.

U.S. Pat. No. 5,228,075 to La et al. teaches a telephone set capable of selectively accepting callers and enabling partial recognitions of callers. The telephone set includes tip and ring terminals, a first analogue switch connected to the tip terminal, a first bridge diode connected to the first analogue switch and the ring terminal, a wave rectifying circuit connected to the first bridge diode, a microprocessor connected to the wave rectifying circuit and the first analogue switch, an EEPROM connected to the microprocessor, a hook switch connected to the microprocessor, and a selecting switch connected to the microprocessor. It further includes a second bridge diode connected to the tip and ring terminals, a hybrid IC circuit connected to the second bridge diode, a DTMF decoder connected to the hybrid IC circuit and the microprocessor, a power supply means for supplying the required power to the internal circuits, and a second analogue switch and a microphone.

U.S. Pat. No. 5,109,408 to Greenspan et al. discloses a call processing embodiment where customers are offered a special dialing plan where received numbers are processed such that a query of a database is defined when a prespecified access code e.g., *66, is received, for example followed by a destination number, but where call blocking is defined for a predefined plurality of destination numbers, e.g. all destination numbers beginning with 976 or 1-900 or all destination numbers beginning with 1, when such numbers are received without the prespecified access code. Illustratively, the database query may result in the customer being prompted for a personal identification number and accordingly 976 or 1-900 access is thereby limited to those knowing the personal identification number. The database may perform other call screening and call management operations such as time of day or day of week screening or limiting the number or cost of 976 calls in a given time period.

U.S. Pat. No. 5,068,891 to Marshall discloses a method and system wherein the amount of credit available to a telephone travel card holder is determined immediately at the completion of a long distance call and the travel card is invalidated if no credit remains. Capture software captures call ticket data at the completion of a call and the ticket data is transmitted to a monitoring computer without delay. The monitoring computer calculates the amount of credit available to that caller and invalidates the travel card if no credit remains by transmitting a signal to all switching equipment stations throughout the telephone system.

U.S. Pat. No. 4,757,186 to Heberle et al. teaches a method which allows the continued use of a credit card which is expired in terms of time or value units for automatic vendors which are in communication with a central evaluation location. The method allows a continuation of telephone calls, even with an expired telephone credit card. This occurs in that debiting of the fee units used or made to the account of the card owner at the central evaluation location in a chronologically limited transition time after every service performance so that a call is not cut-off in the middle of a call.

U.S. Pat. No. 4,706,275 to Kamil discloses a telephone system enabling prepayment for telephone calls, wherein special code and credit information is stored in memory in special exchanges and debited as the call progresses.

U.S. Pat. No. 4,162,377 to Mearns teaches a method for automatically processing call data from a TSPS (Traffic Service Position System) over CCIS (Common Channel Interoffice Signaling) facilities to a remotely located database system to verify the entitlement of the caller to bill the call on a credit card, collect and charge-to-a-third number basis. The call data, dialed by the caller and comprises a credit card or station number together with a personal identification number used by authorized callers in placing the special service calls. The database system includes a memory table of authorized numbers to which the calls are charged and billed. The database transmits CCIS direct signaling verification messages through the signal transfer system to the TSPS signifying the entitlement and nonentitlement of the caller to the call service.

Notwithstanding the above prior art, there are no teachings or suggestions that would render the present invention anticipated or obvious. Accordingly, there is a need to provide a method of providing a message service for limited access telecommunications wherein end users are provided a user unit to access a predetermined message through a telecommunications network system such as the Internet, Intranet, and Extranet without the limitations associated with the prior art.

SUMMARY OF THE INVENTION

The present invention is directed to a method of operating a telecommunications system for providing a message service for limited access telecommunications to a plurality of end users. Existing telecommunications lines in conjunction with a telecommunications network system such as the Internet, Intranet, Extranet or similar environment is utilized. The telecommunications network system contains a computerized system which can be used to establish a billing system for one or more sponsors and to form an account for each sponsor purchasing subsequent usage relating to a site address. The method also includes distributing a user unit to each of a plurality of end users for accessing the site address. Each user unit is given the site address and at least one unique personal identification number. In connection with the billing system, the computerized system is programmed to permit a session of a preset message limit to be made by each end user to the site address provided. This is based on the distributed user unit and accessed only by the unique personal identification number or a password provided to the end user. In response to the end user accessing the site address, a predetermined message or access to data is provided in accordance with the preset message limit. The session is terminated and an appropriate amount is charged to the account of the sponsor.

It is therefore an object according to the present invention to provide a system and method of providing messages to a plurality of users, comprising the steps of providing access to a limited access message system by a plurality of users; providing at least one private identifier to each of the plurality of users, the identifier allowing access to at least one message; limiting access to a message only to users with a private identifier which corresponds to the message; and automatically accounting for access to messages by the plurality of users in a plurality of accounts, the accounts each being associated with the messages.

According to the invention, the messages may comprise alphanumeric data, image data, audible data, or multimedia data, wherein multimedia data includes a plurality of different data types, such as motion video, audio, music, still images, synchronized video and audio, alphanumeric data, and the like.

It is also an object of the invention to provide a method wherein the automatic accounting system charges an account for access to a respective associated message.

The message system may comprise a computer data network, a private access computer data network, packet switching network, central switching network, a public access computer network, a private access computer data network interconnected with a public access computer network, the Internet, an intranet system, an extranet system, a switched access system, and the like.

It is a further object of the invention to provide a message access system and method wherein users are provided with identifiers which comprise passwords, which may be, for example, personal identification numbers, social security numbers, words, alphanumeric codes, phrases, voice patterns, spoken words, and the like. Alternatively, the identifier may be automatically supplied, such as a telecommunication network address, automatic number identification, user account, user name, screen name, or other available associated identifier.

According to the present invention, a single private identifier may be employed by at least two users for access to a message.

It is a still further object of the invention to provide a messaging system and method wherein an identifier is provided "out of band" to the message itself For example, the identifier may be communicated orally or in audio form, by printed communication, by e-mail, by interactive on-line communication system, or the like.

It is another object of the invention to provide a messaging system and method wherein an accounting for access to messages by the plurality of users occurs on the basis of number of accesses and a parameter selected from the group consisting of time of access, duration of access, date of access, identity of user, amount of data delivered to user, data delivery throughput, type of data delivered to user and means of access by user. The accounting may also be based on access to messages by the plurality of users occurs on the basis of a plurality of linked messages. The accounting may further be implemented based on access to messages by the plurality of users occurs on a prepaid basis. For example, a sponsor may provide a prepaid or preauthorized account, which allows a separate service provider to operate a messaging service for which user access costs are subsidized or free. The accounting system therefore allows commercialization and/or advertising functions to be implemented. Access to messages by the plurality of users may be provided according to a plurality of different accounting rates for message access, for example based on the message, demographics or identity of the user, arrangements made with the sponsor or account holder, or on other bases.

It is a further object of the invention to provide a system and method for providing a messaging system in which, in addition to an identifier, access to messages may be limited based on one or more preset requisites selected from the group consisting of: multiplicity of use of an identifier, a subsequent use of an identifier to access a particular message, an outdated identifier, a user identity, and a parameter relating to account balance.

BRIEF DESCRIPTION OF THE DRAWINGS

Various embodiments of the present invention are described and illustrated herein with reference to the drawings in which like items are indicated by the same reference designation, in which.

DETAILED DESCRIPTION OF THE INVENTION

Figure 1:
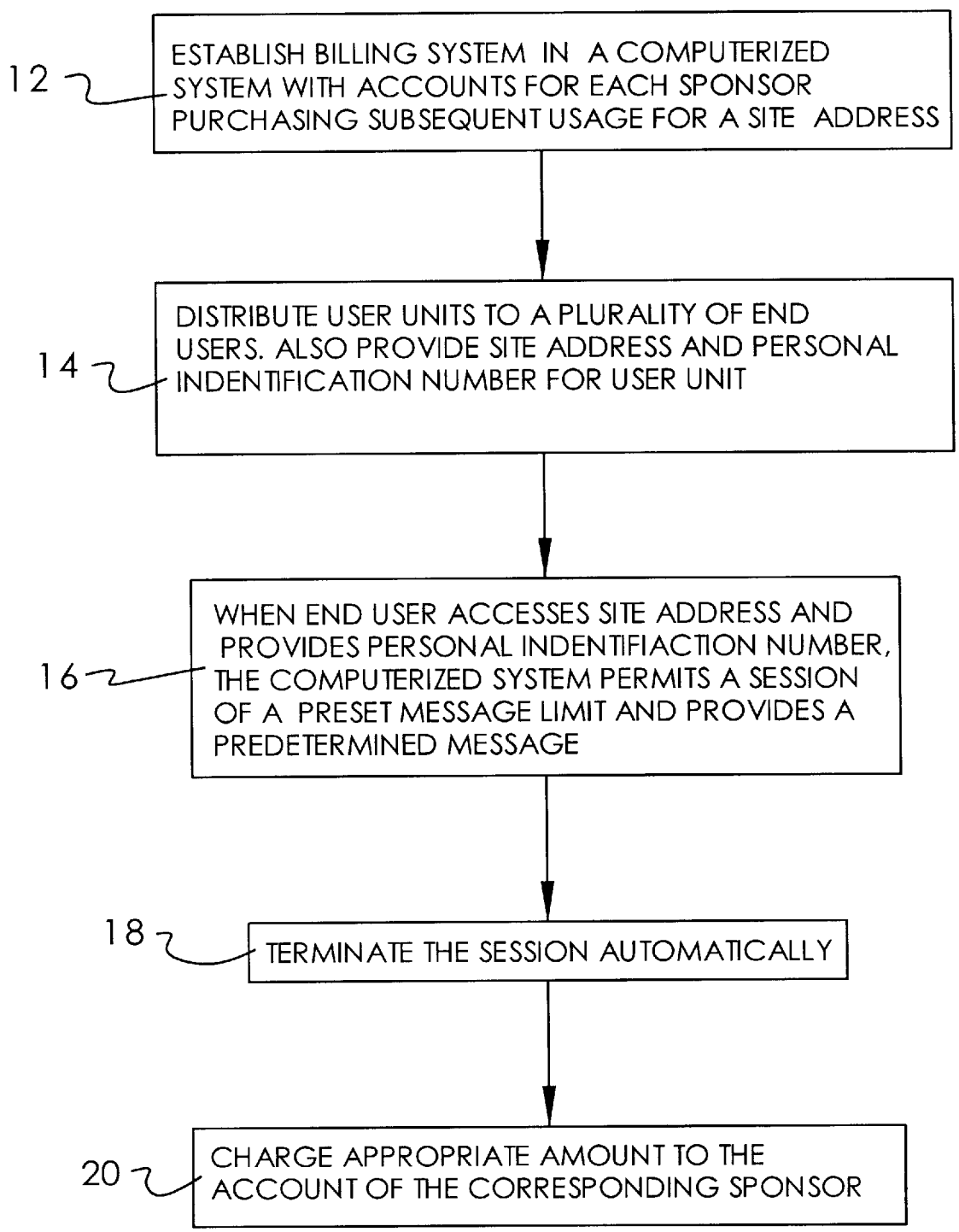
FIG. 1 is a flowchart illustrative of one embodiment of a method for providing a message service according to the present invention.

Turning now to FIG. 1, there is shown a block diagram of one illustrative embodiment of the method for providing a message service for limited access telecommunications according to the present invention. The present invention is a method of providing a message service on a limited access basis through existing telecommunications lines using a telecommunications network system which utilizes a computerized system. It involves delivery of a predetermined message via telecommunications such as an Internet connection of an Internet Service Provider (ISP) or a private data network such as American Online (AOL), CompuServe, Microsoft Network, etc. in conjunction with a measured prepaid financial arrangement.

As shown at step 12, a computerized system can be used to establish a billing system for sponsors and to form an account for each sponsor purchasing subsequent usage relating to a site address. The sponsor, the sponsor's agent, the owner of the site address or the owner's agent distributes a user unit to a plurality of end users. These end users are provided the user unit containing the site address and at least one personal identification number (PIN) which is unique to each user unit as shown at step 14.

As step 16 depicts, in connection with the billing system, the computerized system is programmed to permit a session of a preset message limit to be made by each end user to the site address provided, based on the distributed user unit and accessed only by the unique PIN provided. A predetermined message is provided to an end user accessing the site address and the predetermined message is consistent with the preset message limit. After the predetermined message is provided to the end user, the session is automatically terminated at step 18, and an appropriate amount to the account is charged to the corresponding sponsor at step 20.

Telecommunications can be Internet communications, Internet connection, telephone communications, Extranet communications, Intranet communications or any other transmission of information such as data, text, image, speech, and/or video by means of digital or analog signals. Information can be carried over short or long distances, using a variety of existing telecommunications lines. These telecommunications lines can be physical transmission media such as cables, fiber optic cables, and/or radio, and satellite circuits.

The site address can be a telephone number to access an Intranet, Extranet, ISP or similar private network system, Universal Resource Locator (URL), IP address, network access number, Internet site address, or electronic mail (e-mail) address.

The end user accesses the predetermined message by using a computer, terminal, television having a remote keypad, keypad having remote control, touch screen, personal digital assistant (PDA), Internet appliance pager or any available electronic device having telecommunications capability.

The telecommunications network system (TNS) is a collection of telecommunications equipment and transmission lines, used to interconnect devices (i.e. computers, terminals, telephones, fax machines, etc.) at different locations so that they can exchange information. The TNS can be a central switching network system (CSN) and/or packet switching network system (PSN) such as the Internet, Intranet, Extranet cellular network, or any network environment.

The Internet is a specific collaboration of networks that allows end users at disparate heterogeneous computer networks to communicate with each other across organizational and geographic boundaries. The Internet includes the World Wide Web (WWW), Gopher and File Transfer Protocol (FTP). The WWW is a hypertext view of the Internet. It is a tool through which end users can access other Internet front ends, navigators, information, services, and resources. An Intranet is a TNS typically comprised of standard, off-the-shelf Internet hardware and software within a single domain, or address which is typically protected from the outside by a firewall. An Extranet can be a private or leased network system which is restricted to the general public but open on a limited basis to the customers or defined plurality of end users.

Regarding the Internet, this involves the use of both a CSN and a PSN. An Internet connection is the end user's browser (e.g. Netscape™) looking at a site address. The Internet connection to an ISP is initiated via a CSN or cellular network and then carried on the Internet via a PSN. With a PSN, information to be transmitted is broken down into packets. Each packet contains a header with information that identifies the destination of the packet. Each packet flows separately through the PSN from computer system to computer system until reaching its ultimate destination. The Internet connection is completed by a remote server dialing a destination party via a CSN or cellular network.

The following are examples of how an end user's computer would access the predetermined message using the Internet and an Intranet/Extranet, respectively:

EXAMPLE A

Accessing the predetermined message using the internet/World Wide Web (WWW)/Gopher/FTP An end user's computer dials an Internet Service Provider (ISP) via a CSN using a dialup analog phone line, Integrated Services Digital Network (ISDN), or leased lines. Having logged onto the ISP, the end user points his browser to a particular site address by specifying the URL, or clicking on a hyperlink pointing to the site address. Upon connecting to the desired site address, the end user must enter the PIN provided in the user unit. Verification of the PIN allows entry into the restricted areas (i.e. pages) in that site. The end user may be allowed one entry into such area only, a number of entries, timed entry, or an entry based on data throughput. After each entry, the allotted credit is decremented. The predetermined message can be viewed interactively online, or the message can be downloaded from the site address for viewing at a subsequent time.

EXAMPLE B

Accessing the predetermined message using an Intranet or Extranet

An end user's computer dials a site address (i.e. a telephone number) provided in the user unit to connect to an Intranet or Extranet via a CSN using dialup analog phone lines, ISDN, or leased phone lines. Upon establishing a session with the Intranet or Extranet, the end user is prompted for a PIN provided on the user unit. Upon verification of the PIN, the end user is allowed to log onto the private telecommunications network system. The end user may be allowed one entry into the telecommunications network system only, a number of entries, a timed entry, or an entry based upon data throughput. After each entry the allotted credit is decremented. The predetermined message can be viewed interactively online or the message can be downloaded from the site address for viewing at a subsequent time.

The computerized system can be a local area network (LAN), LAN or Wide Area Network (WAN) connected to the backbone of the Internet, WAN, a mainframe, server, domain computer or a computer situated as part of the Intranet/Extranet. The computerized system would contain the information for each predetermined message. It could contain the hypertext marking language (HTML) for hypertext that is referenced in the predetermined message. The hypertext can serve as a jumping off point to other documents, lists, resources, or actions.

The usage relating to a site address can be based on a predetermined bulk rate for consumption of user time over a preset time period. The usage can be based on data throughput at the site address.

Subsequent attempts by the end user to access the predetermined message with the same unique PIN are blocked through computerized intercepts of either the incoming automatic number identification (ANI) or the PIN or a combination of both ANI and PIN. The PIN can be a sequence of alphanumeric characters such as the combination of the letters A through Z (in either upper- or lowercase) and/or the digits 0 through 9. An ANI can be the phone number, the screen name or e-mail address of the end user pointing to a site address. The computerized system can be programmed to deny access to the predetermined message according to preset requisites by blocking any end user who has previously used the PIN and/or the ANI for access to that predetermined message.

The messages record of each consumed user unit is captured by the computerized system. The message information for the ANI is captured by the computerized system and is provided to the sponsor. This can be used by the sponsor for database marketing.

The user unit is generally in the form of printed material such as a small, flat card which can be fabricated of materials such as paper or plastic. The user unit can be a user card, membership card, collectible card, credit card, collector's trading card, a letter, a greeting card, a holiday occasion card or a special occasion card.

The user unit can be a collectible card which can be a sports card, movie card, television program card, celebrity card, cartoon character card and other specialty cards. The user unit can be in the form of packaging labels, stickers, packaging inserts or any other written or printed medium.

Alternatively, the user unit can be an e-mail. The user unit contains the site address and the unique PIN. The site address can be an Internet URL so the end user can access the predetermined message on the WWW, Gopher or FTP. It can alternatively be a telephone number to access an Intranet or Extranet.

In a preferred embodiment, the user unit is distributed to end users by either a sponsor, the sponsor's agent, the owner of the site address, or the owner's agent, the owner of the network or its agent for a fixed fee. The fixed fee is not based on the length of time of a given call but is a fee which is prepaid by the end user to permit a session. The sponsor or owner of the site address may be interested in limiting data throughput on the site.

In still another preferred embodiment, the user unit is capable of being reactivated at the discretion of the sponsor. Any given user unit may be reactivated through a credit billing system by modification of the computerized system. The computerized system tracks the number of additional access opportunities for a specific PIN or ANI and exhausts the user unit when all additional access opportunities have been consumed. Reactivating may be for any multiple of additional authorized access opportunities. Authorized access opportunities can be events based upon passage of time, change of message, receipt of payment of a bill or invoice or donation. Reactivating is typically accomplished upon a further payment by the end user or some other party via a credit card, check, money order or some other payment means.

The predetermined message can include any information capable of delivery via the Internet, Intranet, Extranet, or similar network environment. The predetermined message can be information such as data, text, pictures, image, speech, sound and/or video. The information can be fully formatted text, or for example, the predetermined message can be documents scripted in HTML in order to be viewed by a browser. The predetermined message can be information sent via an e-mail. E-mail allows an end user to send messages electronically to individuals or groups of individuals. Text files and binary objects such as programs, graphics, word processed, fonts, spreadsheets, audio attachments, and video attachments can be sent via e-mail.

The method can be used to provide message service for many forms of commercial, religious, and personal messages. The commercial message could be related to stock market reports, valuable information, private research databases such as Lexis/Nexis™ or Westlaw™. The commercial message can be an entertainment message, a safety message to aid a lost person, a message with music, a message from a celebrity such as a sports figure, a hero, an author, an actor or other person, information message and political message. These messages can be tied in with information procurement, product promotions, concerts, games, movies and other purposes.

The predetermined message can relate to holidays and special occasions. For example, for a user unit that is a holiday occasion card, the predetermined message can relate to a holiday message. The holiday message can be a Christmas message, Hanukkah message, New Years message, Easter message, April Fool's Day message, July 4th message, Labor Day message, Halloween message or Thanksgiving message, Passover message and Rosh Hashana message. The predetermined message provided for a special occasion card can relate to a special occasion message. The special occasion message could relate to a birthday message, anniversary message, graduation message, Mother's Day message, Father's Day message, christening message and thank you message. For example, a birthday message could comprise a video of relatives who live far away singing Happy Birthday to the recipient/end user.

Figure 2:
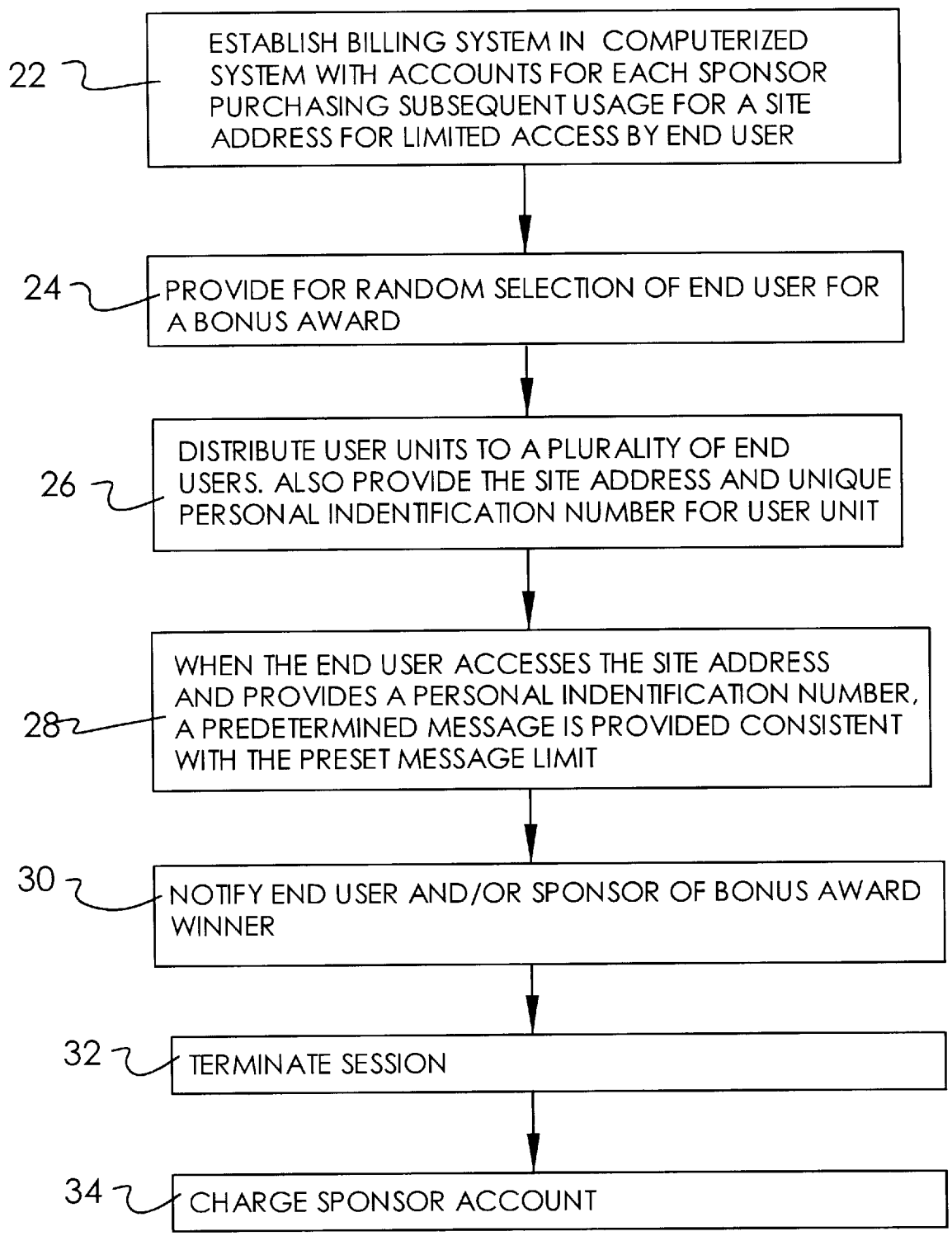
FIG. 2 is a flowchart of illustrative of a second embodiment of a method for providing a message service in conjunction with a bonus award program according to the present invention.

Turning to FIG. 2, this illustrates one embodiment of a method of providing a message service used in conjunction with a bonus award program according to the present invention. At step 22, establishing a billing system in a computerized system with accounts for each sponsor purchasing subsequent usage for a site address for limited access by each end user occurs. At step 24, providing for random selection of an end user for a bonus award occurs. The computerized system is programmed to included a program of chance to randomly select a particular end user from consumed PINs for the purpose of awarding the selected end user a bonus award.

Distributing user units to a plurality of end users and also providing the site address and a unique PIN for the user unit occurs at step 26. When the end user accesses the site address and provides a PIN, at step 28, a predetermined message is provided which is consistent with the preset message limit. The selected end user can be notified automatically by the programmed computerized system that the selected end user has won a prize by providing the predetermined message to the selected end user. The sponsor can be notified by the computerized system as to unique information identifying the source of the selected end user. After the end user and/or sponsor of the bonus award winner is notified at step 30, the session is terminated at step 32, and the sponsor account is charged at step 34.

Figure 3:
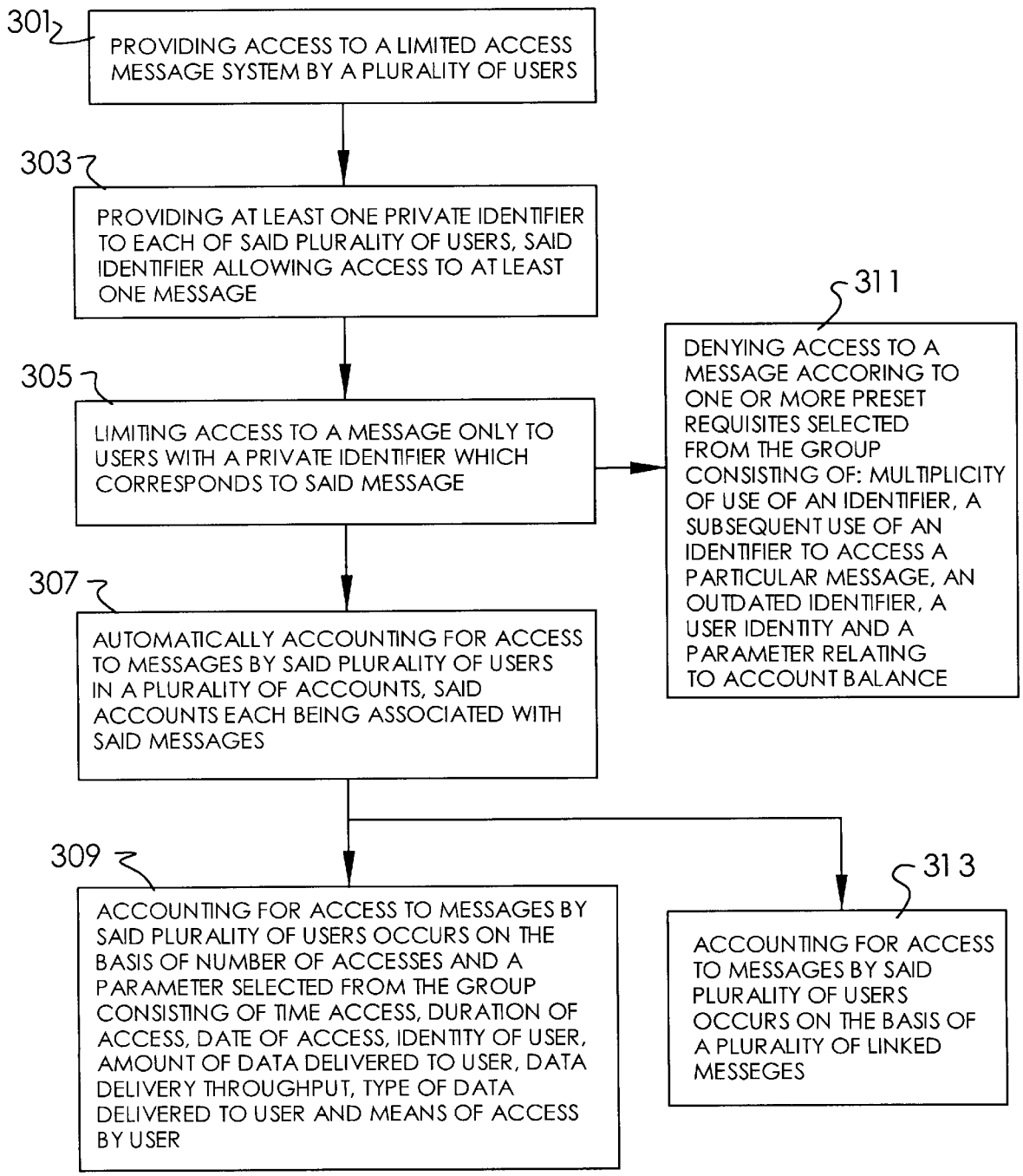
FIG. 3 is a flowchart illustrative of a third embodiment of a method for providing a message service according to the present invention.

Turning now to FIG. 3, a method is described for providing an on-line messaging service. In contrast to the embodiment according to FIG. 1, the time or message units no longer are the main focus of the accounting system. Rather, the system provides automatic accounting for a messaging system which serves a plurality of users. The system provides limited access at step 301, meaning that the public at large cannot access the messages without qualification. The qualification may, however, have high or low standards depending on the nature of the system. A non-trivial system provides access to a plurality of users, and generally includes a plurality of messages as well. In order to allow access to a message, at least one private identifier is provided to each of said plurality of users at step 303. The private identifier exchange therefore provides the qualification discussed above, and as stated above, the secrecy of the private identifier may vary depending on the application. The system limits access to a message only to users with a private identifier which corresponds to the message at step 305. The system automatically accounts for access to messages by the plurality of users in a plurality of accounts, the accounts each being associated with the messages at step 307. Therefore, the accounting process is somewhat independent of the access process, allowing separate billing or compensation, and allowing a service provided to receive compensation or revenue from the account, independent of any accounting from the user. Accounts may be prepaid or preauthorized, or operate according to other accounting principles.

At 309 is shown an optional implementation detail of the automatic accounting system. In this option, access to messages by the plurality of users may occur on the basis of number of accesses and: time of access, duration of access, date of access, identity of user, amount of data delivered to user, data delivery throughput, type of data delivered to user and/or means of access by user. At 311, a further optional implementation detail of the automatic accounting system is provided, in which at least one message is linked to one other message, and the accounting for access to messages by the plurality of users occurs on the basis of a plurality of linked messages, which accounting may be different than an accounting based on delivery of the message itself or multiple messages.

The system may further act to deny access to a message according to various requisites, including multiplicity of use of an identifier, a subsequent use of an identifier to access a particular message, an outdated identifier, a user identity, and/or a parameter relating to account balance, as shown in optional detail 313.

The following are some examples of illustrative embodiments of the user units and predetermined message for using in the method according to the present invention:

EXAMPLE 1

Teltalkie™ Trailers: The Pocket Preview

The Pocket Preview Card (PPC) is a user unit and can be in a form of discount coupon card and contest entry. The PPC is a totally unique way to advertise and promote motion pictures and their related products. For the first time, a consumer can access a predetermined message that is a direct, immediate audiovisual access to the story line of the motion picture, its characters or any other message regarding film promotion. In addition, the PPC can be used as a souvenir collectible.

In addition to the PIN and site address, the front side of the PPC can carry the movie logo and other advertising information. The PIN and site address can optionally be contained on the reverse site of the PPC. On the reverse side, the PPC can carry consumer discounts for use at the theater or with any other cross promotional vendors associated with the movie. This would become valid only when the session is completed. The perceived value of the coupons on the PPC will far exceed the retail price of the PPC as a stand alone product. In addition, motion picture executives can garner an instant measure of consumer interest. This can be coupled with database collection for marketing.

The PPC enables the end user to enter a site address that accesses a audio message and related video clips from any computer, television having a keypad, remote keypad, or touch screen, touch screen electronic device or any electronic device having Internet access capability or telecommunications capability. The predetermined message has audio and related graphics information. the predetermined message can provide actual script from the movie or a spoken line from one of the characters, or any other promotion. The video clips can be viewed at the site address and/or downloaded to the end user's computer system for further viewing at another time.

EXAMPLE 2

Teletalkie™ Tales: The Audio Comic Book Card

The Audiovisual Comic Book Card (ACBC) is a user unit which is a combination entertainment, promotional, merchandising and marketing device. The ACBC can be sold as a stand alone product or as an insert into existing products. Once the site is accessed, the end user views and hears one piece of an ongoing story coupled with a promotional message, a contest entry, or any other suitable announcement. The ongoing story can be animated cartoon characters related to a comic book story. The characters would have both audio and graphic aspects to them. All of this is designed to encourage the end user to purchase additional ACBCs to continue to view and hear the story. A single story could involve multiple characters, interwoven story lines or any other combination of themes and characters, requiring the purchase of many ACBCs in a set.

The ACBC is not simply an audiovisual message, but rather a collector's item. ACBCs can be sold in sequential series, character series or by subscription. ACBCs can also be used to test market new themes, characters or even new comic books and to act as live comment cards on existing issues. Once the end user is online, the predetermined message can request database information stimulated by a surprise offer once the data information is submitted by the end user. The surprise offer can be anything from additional story lines to promotional giveaways.

The ACBC can also be packaged with existing printed comic books to offer tangent plots, new developments, etc. Used creatively, the ACBC can enhance the printed comic story, providing information not found in the printed material or developing plots only hinted at in the printed comic. ACBCs can also be used as the vehicle to provide coupon offers, discounts to purchasers of additional comic book materials, action figures, or any number of cross promotionals. Most importantly, every use of the ACBC provides the comic book publisher with information concerning a potential purchaser.

EXAMPLE 3

Teletalkie™ Tunes: The Rock Talk Card

The Rock Talk Card (RTC) is a user unit that allows the end user to view the musical artist or member of the band talking about a new release or some other personal insight or message of interest. Additionally, the message can provide audiovisual clips from such televised programs as Music Television (MTV) and Video Hits 1 (VH1). This message is coupled with a promotion, a contest entry, or a sales offer. Once the end user is online, the message can also query the end user for database information such as the end user's interest in purchasing the new compact disc (CD), or a comment section on a song, etc. The message can request database information stimulated by a surprise offer once the data information is submitted by the end user. The RTC can also be packaged within existing media including CDs, rock magazines, posters, music scores, etc. RTCs can also be used as the media to provide coupon offers, discounts to purchasers of additional artist licensed products such as clothing, musical instruments, music videos, etc.

EXAMPLE 4

Teletalkie™ Teams: The Sport Card

Perhaps the largest market for Teletalkie™ is the existing sports card collectible market. A sports card (SC) is a user unit that allows the end user to view a sports celebrity and hear his voice. The SC can be used as a chase card in existing sports trading card products. It can be used as a premium at games in order to increase ticket sales. It can be used in cross promotionals with other products sold at the sports event.

Because the message can be changed as required, listening to the sports hero can be as fresh and relevant as last night's game. The predetermined message can contain audiovisual clips of the most dramatic moments of the sporting event. It can allow the interested consumer to view to one of the sporting event contestants before the big event. Combined with co-sponsor offers, the SC can also deliver advanced ticket sales billed to a credit card and delivered to the end user's address.

EXAMPLE 5

The Teletalkie™ Santa Claus Card

The Teletalkie™ Santa Claus Card (SCC) is a user unit which allows an end user such as a child or adult to share her Christmas wish to Santa Claus. In this application, the information spoken by the end user is captured and digitally recorded. A picture, movie, or video of the end user can also be digitized and transmitted using telecommunications such as the Internet, Intranet, or Extranet. It is then matched to the PIN from the SCC in order that a hard copy transcription of the end user's wish can be sent to the parent, grandparent, relative, or friend who purchased the card. Alternatively e-mail can be sent to Santa Claus. This e-mail could be forwarded to the purchaser/subscriber's e-mail account or optionally a hard copy can be delivered to the purchaser/subscriber. The entire package is designed to allow merchandisers a way to target specific potential purchasers with exact requests from the end user of the SCC.

EXAMPLE 6

Application of the Wish Card to the Premium/Incentive Market

By enabling the relatives of participants in incentive programs to express their wishes via e-mail in this unique format, the Premium/Incentive firm (P/I) can capture merchandise data directly from the potential buyer. The Wish Card (WC) is a user unit provided by the P/I for each participant and the PIN identifies the incentive program participant. WCs can be given in quantities for use by relatives and friends, but in every case, the PIN identifies the incentive program participant.

The information is captured and the PIN are stored so that the P/I knows which participant potentially wants what merchandise. The P/I uses this information to notify participants of the individual's desires.

EXAMPLE 7

The Greeting Card

Used in a variety of applications, the Greeting Card (GC) is a user unit which can be coupled with other promotional or bonus items, but its appeal is in the predetermined message received. In the greeting card market, the GC can provide a predetermined message from a famous person to anyone who purchases or receives the GC. For example, the predetermined message can be a video from Marilyn Monroe wishing the holder of the GC a Happy Birthday, or Bing Crosby singing the song White Christmas. The GC is also capable of complete customization, allowing the purchaser of the GC to put her own picture on the GC and have the GC deliver a personal message from the purchaser to the card recipient/end user.

EXAMPLE 8

The Specialty Card

Using existing technology, the Specialty Card (SPC) is a user unit which simply requires printing to specific customer orders in pre-sold quantities. In the hotel and travel market, SPCs can be issued in small quantities that carry a specific customer logo and message. There are literally dozens of applications of such a product, including specialty events, tourist and travel applications, gift giving, etc. The SPC could be used with major metropolitan governments and other organizations for a variety of promotional and charitable projects.

EXAMPLE 9

The Business Card

The Business Card (BC) is a user unit which can be printed with business information such as a company logo, company slogan, employee name, address, telephone number, etc. In this application, the BC is designed to allow the end user connect to the sponsor's site address through most private networks such as AOL, CompuServe, MSN or an ISP such as WorldNet, NetCom, etc. without cost to the end user. The technology is available to provide a message from the sponsoring business every time the end user uses the BC.

EXAMPLE 10

The Book Talk Card

The Book Talk Card (BTC) is a user unit that can be used to advertise and promote new books. When a book is in the promotional stage, the predetermined message can be part of the text, an audiovisual statement from the author or any number of marketing messages. The BTC can be sent to bookstores in advance of the book release, with the option at the end of the message to order the book by simply pressing a key on the computer, clicking a certain button on the computer screen, pressing a key on a television set having a keypad or remote keypad, pressing the touch screen of a television, touch screen electronic device, or via e-mail. Publishers can produce short video clips or animated cartoons to advertise the new books on the Internet accessed by the end user. Publishers can capture two important databases, namely buyers who demonstrated interest and buyers who requested a sale. Both types of buyers can also be offered discounts on other publications, and/or catalogues.

EXAMPLE 11

The Rock Concert Card

The Rock Concert Card (RCC) is similar to the SC described above but has application to Rock Concerts.

EXAMPLE 12

The Call To Giving Card

The Call to Giving Card (CGC) is a user unit which provides the caller with a message concerning a charitable cause. This allows the caller to give directly to the organization by completing the response through a computer, television having a keypad, remote keypad, or interactive touch screen. Donations can be billed directly to a credit card of the end user, information can be taken by computer or by transferring to a live operator or automated operator. A cyber-dollars donation can be made. Alternatively, a donation can be given by e-mail.

EXAMPLE 13

The Help Card

The Help Card (HC) is a user unit where a sponsor or owner of the site address could produce an entire package for an end user (such as a child or alternatively an adult having Alzheimer's disease) which includes registration, name, address, telephone contacts and emergency contact. The package could include a business reply return form. All information is entered into a database in conjunction with the PIN assigned to that end user. The end user retains the site address and the PIN in a printed form contained in either a wristband, locket, or wallet.

The central database library stores a recognizable voice such as the person who is the telephone contact or emergency contact or alternatively, a character such as ET™ or Kermit™ saying the person's name, attached to the identifying PIN, in a messages record stored in the computer database. When the end user accesses the site address, the voice answers, speaking the end user's name. This is accomplished using digital storage technology and recalling the name from the PIN identification. The computerized system looks in a separate database to find the closest police station, determined by the ANI identification of the incoming call. The computerized system dials the police number, identifies the end user in trouble and connects the end user's call directly to the police on the line. The computerized system then dials the telephone contact and/or the emergency contact's number, playing a message that the end user has called for help and is being referred to the police at the police telephone number.

The sponsor notifies the end user, emergency contact and/or telephone contact by mail or other means such as e-mail that the HC has been used and offers a reissue. In order to prevent abuse, the HC can only be used once and must then be resubscribed.

Although various embodiments of the invention have been shown and described herein, they are not meant to be limiting. Those skilled in the art may recognize certain modifications to these embodiments, which modifications are meant to be covered by the spirit and scope of the appended claims.

What is claimed is:

1. A method of providing messages to a plurality of users, comprising the steps of:
    (a) providing access to a limited access message packet network system by a plurality of prepaid users through a packet switching network;
    (b) providing at least one private identifier to each of said plurality of users, said identifier allowing access to at least one message;
    (c) limiting access to said message only to users with said private identifier which corresponds to said message;
    (d) automatically accounting for access to said messages by said plurality of users in a plurality of accounts, said accounts each being associated with said messages; and
    (e) said accounting for access to said messages by said plurality of users occurs on the basis of number of accesses and a parameter selected from the group consisting of time of access, duration of access, date of access, identity of user, amount of data delivered to user, data delivery throughput, type of data delivered to user and means of access by user.

2. The method according to claim 1, wherein at least one of said messages comprises alphanumeric data.

3. The method according to claim 1, wherein at least one of said messages comprises data selected from the group consisting of image data and audible data.

4. The method according to claim 1, wherein at least one of said messages comprises multimedia data.

5. The method according to claim 1, wherein said automatic accounting charges an account for access to a respective associated message.

6. The method according to claim 1, wherein said message system comprises a computer data network.

7. The method according to claim 1, wherein said message system comprises a private access computer data network.

8. The method according to claim 1, wherein said message system comprises a private access computer data network interconnected with a public access computer network.

9. The method according to claim 1, wherein said private identifier is a password.

10. The method according to claim 1, wherein said private identifier is a telecommunication network address.

11. The method according to claim 1, wherein said private identifier is employed by at least two of said users for access to a message.

12. The method according to claim 1, wherein said private identifiers are communicated to said users through a communications channel other than said limited access message system.

13. The method according to claim 1, wherein said limited access message system comprises a packet switching network system.

14. The method according to claim 1, wherein said limited access message system comprises a central switching network system.

15. The method according to claim 1, wherein said limited access message system comprises the Internet.

16. The method according to claim 1, wherein at least one message is linked to one other message, said accounting for access to messages by said plurality of users occurs on the basis of a plurality of linked messages.

17. The method according to claim 1, wherein said accounting for access to messages by said plurality of users occurs on a prepaid basis.

18. The method according to claim 1, wherein said accounting for access to messages by said plurality of users provides a plurality of different accounting rates for message access.

19. The method according to claim 1, further comprising the step of:
    denying access to a message according to one or more preset requisites selected from the group consisting of: multiplicity of use of an identifier, a subsequent use of an identifier to access a particular message, an outdated identifier, a user identity, and a parameter relating to account balance.

* * * * *